Feb. 5, 1935. S. J. FAIRCHILD 1,990,227
SORTING TABLE
Filed July 13, 1933

INVENTOR.
Stephen J. Fairchild.
BY Philip A. Minnist
ATTORNEY.

Patented Feb. 5, 1935

1,990,227

UNITED STATES PATENT OFFICE 1,990,227

SORTING TABLE

Stephen J. Fairchild, Pasadena, Calif., assignor to Food Machinery Corporation, San Jose, Calif., a corporation of Delaware Application July 13, 1933, Serial No. 680,180

5 Claims. (Cl. 209—125)

In the fruit packing industry, as is well known, it is the customary practice to sort and classify the fruit before packing the same for shipment to the market, according to the variations in quality as, for example, color, soundness, freedom from blemishes and other imperfections, uniformity of shape, or other characteristics of a like general nature. These operations are ordinarily performed manually by one or more operators or "sorters", to whom the fruit is presented for inspection and sorting, as by means of a suitable sorting or grading table such as may pass the fruit slowly before and in full view of the operators to enable them to inspect and select or grade the fruit according to the desired distinguishing characteristics.

The present invention is concerned with a novel form of sorting or grading table such as may suitably be used to convey fruit before operators for the purpose referred to, and the principal object of the invention is to provide a table of this character which is simple and inexpensive in construction and yet is operative to thoroughly and effectively display the fruit to the operators.

More specifically, it is an object to provide a sorting or grading table which is designed to convey fruit for inspection and sorting purposes while simultaneously rolling the fruit about upon various axes to expose all portions of its surface to full view.

With these and other objects in view, the invention resides in the novel construction and combination of parts hereinafter described, illustrated in the accompanying drawing and set forth in the appended claims; it being understood that various changes in form, proportion, size and details of construction within the scope of the claims may be resorted to without departing from the spirit or sacrificing any of the advantages of the invention.

Figure 1:
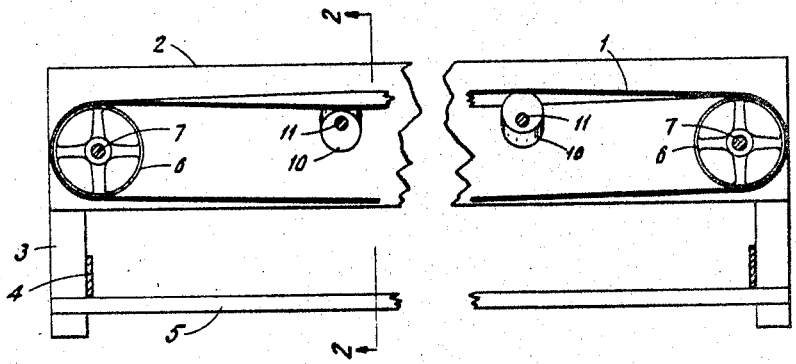
Figure 1 is a side elevation of a sorting table embodying the principles of my invention, taken along the line 1—1 of Figure 2.
Figure 2:
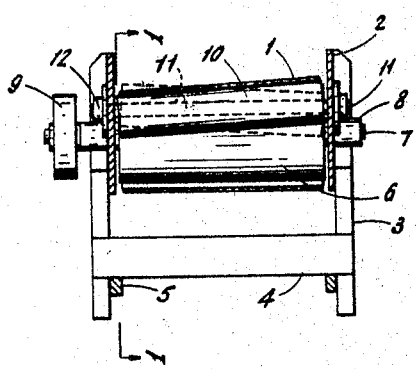
Figure 2 is a sectional elevation of the apparatus taken along the line 2—2 of Figure 1, illustrating the eccentric mounting of the rollers employed to tilt and agitate the sorting belt.

In the illustrated embodiment, an endless conveyer belt 1 is provided, the upper run of which forms a conveying and supporting table upon which the fruit is carried in full view of the operators between a pair of spaced guard walls or rails 2 which serve to prevent the fruit from rolling sideways off the belt, and which form part of a suitable framework including also the corner posts 3 and the transverse and longitudinal braces 4 and 5, respectively. The belt 1 is trained around and supported by a pair of drums or pulleys 6 rotatably mounted at opposite ends of the frame upon transverse supporting shafts 7 journalled in suitable bearings 8 carried by the walls 2. One of the pulley shafts 7 may be extended as shown for the reception of a driving pulley 9 to which power may be supplied from any suitable source for driving the conveyer belt.

In the operation of the mechanism thus far described, it will be seen that, except for the mechanism presently to be described, the supporting surface of the conveyer belt would travel in a substantially horizontal plane, with the result that any fruit deposited upon the belt would be carried along bodily without change of its relative position with respect to the belt, so that only the upper surfaces of the fruit would be exposed to the view of the operators. In order, therefore, to provide for effective exposure of all surfaces of each piece of fruit to inspection, the present invention includes means for causing the fruit to roll about upon various axes over the surface of the belt during its travel thereon. Such means may be in the form of one or more rollers 10, disposed to support the conveying run of the conveyer belt and so mounted that their rotation will impart a side to side tilting or wavelike motion to the belt surface. This is accomplished by mounting the rollers eccentrically upon transversely arranged supporting shafts 11 in such manner that the center lines of the shafts extend at an angle to the longitudinal axes of the rollers, as clearly illustrated in the drawing. The roller shafts 11 may be rotatably journalled in supporting bearings 12 carried by the guard walls 2.

It will be seen that although in the illustrated embodiment the rollers 10 are of the idler type and independently driven by frictional contact with the under surface of the belt 1, they may be interconnected for timed operation if desired and may also optionally be power driven. It will also be understood that either a fewer or greater number of rollers than shown may be employed, according to the length of the endless belt, which may obviously be of any selected length.

It is believed that it will now be apparent from the foregoing description that in the operation of the apparatus the endless conveyer belt 1, in traveling over the rollers 10, causes them to rotate, and by reason of the angular mounting of the rollers upon their supporting shafts 11 a wobbling motion is imparted to them as their opposite ends are successively and alternately raised and lowered during rotation. This wobbling motion of the rollers 10 causes the belt 1 to tilt back and forth from side to side in wavelike fashion, so that the fruit being conveyed is rolled diagonally back and forth across the width of the belt upon various axes, thereby effectively and repeatedly exposing all surfaces to the operators who stand alongside the machine and sort the fruit according to selected standards.

It will be understood that, while for the purposes of this disclosure the invention has been described in connection with the sorting of fruit, its usefulness is not necessarily confined thereto but may extend to other articles as well, such as, for example, vegetables, melons, or other articles of a rollable nature, and the term "fruit" as used herein is intended to be inclusive of such other articles.

Having now described my invention and in what manner the same may be used, what I claim as new and desire to protect by Letters Patent is:

1. A sorting table comprising an endless conveyer, means for driving the same, revoluble means disposed in fixed location beneath an intermediate portion of the conveying run of said conveyer and engaging therewith, means mounting said revoluble means for wobbling motion as the latter revolves so as to tilt said conveying run back and forth from side to side, and means for preventing conveyed articles from rolling sideways off the conveyer.

2. A sorting table comprising an endless conveyer, means for driving the same, revoluble means disposed in fixed location beneath an intermediate portion of the conveying run of said conveyer and engaging therewith, means for causing said revoluble means to tilt back and forth as the latter revolves to periodically tilt said conveying run back and forth from side to side to cause rollable articles supported thereon to roll back and forth across the conveyer, and means for preventing conveyed articles from rolling sideways off the conveyer.

3. A sorting table comprising an endless conveyer, means for driving the same, a roller engaging the underside of an intermediate portion of the conveying run of said conveyer, means mounting said roller for rotation about an axis angularly related to the longitudinal axis of the roller to cause it to tilt said conveying run back and forth from side to side as the roller revolves, and means for preventing conveyed articles from rolling sidewise off the conveyer.

4. A sorting table comprising an endless conveyer, means for driving the same, a roller extending transversely beneath an intermediate portion of the conveying run of said conveyer and engaging therewith, means mounting said roller for rotation about an axis at an angle to the longitudinal axis of the roller to cause said roller to tilt the conveying run of said conveyer back and forth as the roller revolves, and means for preventing conveyed articles from rolling sideways off the conveyer.

5. A sorting table comprising an endless conveyer, means for driving the same, an idler roller extending transversely beneath an intermediate portion of the conveying run of said conveyer and driven by engagement therewith, means mounting said roller for rotation about an axis at an angle to the longitudinal axis of the roller to cause said roller to tilt the conveying run of said conveyer back and forth as the roller revolves, and means for preventing conveyed articles from rolling sideways off the conveyer.

STEPHEN J. FAIRCHILD.